US011565916B2

(12) United States Patent
Ladra et al.

(10) Patent No.: US 11,565,916 B2
(45) Date of Patent: Jan. 31, 2023

(54) METHOD FOR MOVING A LOAD WITH A CRANE IN A COLLISION-FREE MANNER

(71) Applicant: Siemens Aktiengesellschaft, Munich (DE)

(72) Inventors: Uwe Ladra, Erlangen (DE); Alois Recktenwald, Herzogenaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/607,156

(22) PCT Filed: Feb. 26, 2020

(86) PCT No.: PCT/EP2020/054965
§ 371 (c)(1),
(2) Date: Oct. 28, 2021

(87) PCT Pub. No.: WO2020/221490
PCT Pub. Date: Nov. 5, 2020

(65) Prior Publication Data
US 2022/0204319 A1 Jun. 30, 2022

(30) Foreign Application Priority Data
Apr. 30, 2019 (EP) .................................... 19171945

(51) Int. Cl.
*G06F 7/70* (2006.01)
*G06F 19/00* (2018.01)
(Continued)

(52) U.S. Cl.
CPC ............ *B66C 13/46* (2013.01); *B66C 15/045* (2013.01); *B66C 19/007* (2013.01); *B66C 2700/084* (2013.01)

(58) Field of Classification Search
CPC ..... B66C 13/46; B66C 15/045; B66C 19/007; B66C 2700/084
(Continued)

(56) References Cited

U.S. PATENT DOCUMENTS

2009/0114612 A1* 5/2009 Nelson .................. B66C 15/045 212/276
2012/0092643 A1* 4/2012 Rintanen ................ B66C 13/46 356/4.01
(Continued)

FOREIGN PATENT DOCUMENTS

EP 2402280 A1 1/2012
EP 2927176 A1 10/2015
(Continued)

OTHER PUBLICATIONS

PCT International Search Report and Written Opinion of International Searching Authority dated Jun. 24, 2020 corresponding to PCT International Application No. PCT/EP2020/054965 filed Feb. 26, 2020.

*Primary Examiner* — Mahmoud S Ismail
(74) *Attorney, Agent, or Firm* — Henry M. Feiereisen LLC

(57) ABSTRACT

A method for moving a load with a crane in a collision-free manner in a space having at least one obstacle includes providing a position of the obstacle, providing at least one safe state variable of the load, determining from the safe state variable a safety zone surrounding the load, and dynamically monitoring the safety zone in relation to the position of the obstacle.

13 Claims, 4 Drawing Sheets

(51) Int. Cl.

| | |
|---|---|
| ***G06G 7/76*** | (2006.01) |
| ***G06G 7/00*** | (2006.01) |
| ***B66C 13/46*** | (2006.01) |
| ***B66C 15/04*** | (2006.01) |
| ***B66C 19/00*** | (2006.01) |

(58) Field of Classification Search
USPC .............................................................. 701/50
See application file for complete search history.

(56) References Cited

U.S. PATENT DOCUMENTS

| | | | | |
|---|---|---|---|---|
| 2015/0142277 | A1* | 5/2015 | Eriksson | B66C 15/045 701/50 |
| 2017/0097626 | A1* | 4/2017 | Kaufleitner | F16P 3/144 |
| 2019/0100382 | A1 | 4/2019 | Skotschek | |
| 2019/0308852 | A1 | 10/2019 | Heimann et al. | |

FOREIGN PATENT DOCUMENTS

| | | | |
|---|---|---|---|
| KR | 20140087929 | A | 7/2014 |
| WO | WO 2005049285 | A1 | 6/2005 |
| WO | WO 2018007203 | A1 | 1/2018 |

* cited by examiner

METHOD FOR MOVING A LOAD WITH A CRANE IN A COLLISION-FREE MANNER

CROSS-REFERENCES TO RELATED APPLICATIONS

This application is the U.S. National Stage of international Application No. PCT/EP2020/054965, filed Feb. 26, 2020, which designated the United States and has been published as International Publication No. WO 2020/221490 A1 and which claims the priority of European Patent Application, Serial No. 19171945.9, filed Apr. 30, 2019, pursuant to 35 U.S.C. 119(a)-(d).

BACKGROUND OF THE INVENTION

The invention relates to a method for moving a load with a crane in a collision-free manner in a space having at least one obstacle.

The invention also relates to a controller for carrying out a method of this type.

The invention further relates to an independent, safe monitoring module for collision detection, which has such a controller.

Furthermore, the invention has a system with a crane for moving a load, which comprises such a monitoring module.

In the crane environment, for example, in ports during the loading and unloading of loads, for example, containers, collisions occur again and again between an, in particular, rope-suspended load, and an obstacle, also referred to as an object. In the case of a manually operated crane, the whole responsibility for the crane and the load carried by it rests with the crane operator. He must ensure that a collision with another object does not occur.

In the case of an automatically operated crane, the, in particular, rope-suspended load is guided with sensor support through a 2D or 3D space having at least one obstacle, wherein by means of hardware and software solutions, it must be ensured that no collisions occur. For example, systems such as an oscillation damping, also known as "sway control", path calculation in 2D or 3D space and systems for acquiring obstacles and disturbance variables are utilized.

The complete safety certification of a solution of this type having a plurality of systems represents a significant effort since each of the subsystems must be safety certified individually. A safe functioning of the whole system is only assured if all the subsystems fulfil the safety-related requirements.

For example, the published application WO 2005/049285 A1 discloses a system for sway control. The system comprises a first apparatus which is connected to measure an acceleration of a first object which is suspended from a second object, wherein the first apparatus generates a first signal which represents the acceleration of the first object; a second apparatus which is connected to measure an acceleration of a second object, wherein the second device generates a second signal which represents the acceleration of the second object; a processor which is connected to the first and second apparatuses and is configured to determine a sway of the first object in relation to the second object on the basis at least partially of the first and second signals, wherein the sway represents a relative displacement of the first object in relation to the second object.

For a real time route planning in the 2D/3D space, simplifications in the algorithms would be required, which for a safety certification, represent a significant effort with regard to the provision of evidence of safe functioning. For systems such as sway control, the attempt is made to achieve a safety certification by means of redundancy.

The published application WO 2018/007203 A1 describes a method for preventing a collision of a load of a crane with an obstacle. In order to provide a solution to collision prevention which meets a safety level, a solution is proposed in which the load is moved along a trajectory wherein a height profile is acquired at least along the trajectory by means of at least two sensors for distance measurement, wherein signals from the sensors are transmitted via at least two communication channels to a controller having at least two operating systems of which at least one has a safety program in a secure region, wherein an obstacle is detected along the trajectory by means of the height profile. The controller also has a secure communications interface for transmitting signals from the controller to a crane control system.

It is an object of the invention to provide a method for moving a load with a crane in a collision-free manner which meets a safety level in the simplest possible manner.

SUMMARY OF THE INVENTION

The object is achieved according to the invention by means of a method for collision-free movement of a load with a method for collision-free movement of a load with a crane in a space having at least one obstacle, wherein a position of the obstacle is provided, wherein at least one safe state variable of the load is provided, wherein from the safe state variable, a safety zone surrounding the load is determined, wherein the safety zone is dynamically monitored in relation to the position of the obstacle.

The object is further achieved according to the invention by means of a controller for carrying out a method of this type, which comprises a safety program in a secure region.

Furthermore, the object is achieved according to the invention by means of an independent safe monitoring module for collision detection, which has such a controller.

Furthermore, the object is achieved according to the invention by means of a system with a crane for moving a load, which comprises such a monitoring module.

The advantages and preferred embodiments disclosed below in relation to the method can be applied accordingly to the controller, the monitoring module and the system.

The invention has as its basis the concept of providing an independent, safe monitoring module for collision detection in order to enhance a sensor-supported load movement by an automatically operated crane system which itself has a high level of reliability, but is not technically certified with regard to safety. By means of a collision detection of this type, a safety level according to SIL and/or PL, for example, at least SIL3 and/or PLe is achievable without the actual crane system having to be safety certified.

A position of an obstacle is provided. For example, a load position is provided by means of suitable sensor systems, in particular, laser distance sensors. Furthermore, at least one safe state variable of the load that is moved by the crane is provided. A state variable is, for example, a position of at least one movement axis, a velocity or an acceleration. A safe state variable of the load is provided, for example, by safe sensor systems certified, in particular, at least according to SIL or PL and/or by redundant sensor systems. On the basis of the at least one safe state variable of the load, a safety space is calculated which is monitored in relation to the determined position information items regarding the obstacle. For example, the safety space is configured spherical or ellipsoid and at least partially surrounds the load. If this safety space is violated, for example, a countermeasure is introduced in order to prevent a collision.

A method of this type can be described with a very simple mathematical model and can be realized with a small computational effort. A safety certification as described above is enormously simplified. A further advantage lies therein that the systems used for the sensor-supported load movement in automatic crane operation such as sway control and route calculation are further usable as a non-safe system for movement control. The independent, safe monitoring system for safe collision detection, which is configured, in particular, as at least one module, enhances with a high level of reliability a system which, however, is classified as not safe, to a safe overall system. The independent safe monitoring module which functions according to the method described above ensures a safe automated crane operation, independently of the systems used for the automated crane operation.

In a preferred embodiment, a safe position of the obstacle is acquired, in particular by means of sensors for distance measurement. Sensors for distance measurement are, for example, laser or radar sensors. A safe position acquisition is achieved, for example, with the aid of safe sensors, in particular, certified according to SIL and/or PL for distance measurement. A safe position acquisition of the obstacle increases the reliability of the method.

In a further advantageous embodiment, the at least one safe state variable of the load is determined from a safe state variable of at least one running gear, a lifting gear and/or a trolley of the crane. Suitable safe sensor systems which are certified, for example, according to SIL and/or PL are commercially available.

Particularly advantageously, a stop signal is sent to a crane control system if the obstacle is acquired in the safety zone surrounding the load, By means of a crane stop triggered by a stop signal, a collision is easily and reliably prevented.

In a preferred embodiment, a size of the safety zone is adapted to the safe state variable of the load. The size of the safety zone is defined, in particular, by a volume. For example, the volume of the safety zone is enlarged when the velocity or the acceleration of the load is increased in order to compensate for a greater deceleration time in the event of a countermeasure. In this way, a collision is still more reliably prevented.

In a further advantageous embodiment, the safety zone is determined with a controller which comprises a safety program in a secure region. The safety program in the secure region is realizable, for example, by means of redundancy, multi-channel capability and/or internal checking and testing algorithms, whereby a safety certification, for example, according to SIL and/or PL, is realizable.

Particularly advantageously, a stop signal is sent by the safety program to a crane control system if the obstacle is acquired in the safety zone surrounding the load. By this means, a safety region surrounding the load is defined, within which, on encountering an obstacle, the crane is immediately and safely stopped.

In a preferred embodiment, the safe state variable of the load comprises a position and a velocity and/or an acceleration. For example, a velocity and/or an acceleration is determined by differentiation from the change hi the position. Through the knowledge of the position and the velocity and/or the acceleration of the load, the reliability of the monitoring of the load is optimized.

Particularly advantageously, the safety zone is determined in real time. A determination in real time is achieved through simple mathematical models which enables a reliable reaction to changes in the position of the obstacle.

In a preferred embodiment, the safety zone is periodically determined at temporal intervals dependent upon the safe state variable of the load. For example, the temporal intervals at a higher velocity of the load are smaller in order to react to an elongated braking distance. Such state variable-dependent intervals enable a reliable reaction to changes in the system.

In a further advantageous embodiment, the safety zone is determined with an oscillation model. The oscillation model models, for example, a swinging-out of the load on an abrupt deceleration, so that in such a case, for example, the safety zone is enlarged in order to prevent a collision.

Particularly advantageously, the method is executable independently of the movement of a load. Thus, the method is not influenced by the crane operation, for example, by errors arising during the operation, which leads to an improvement in the reliability.

In a further advantageous embodiment, with the aid of sensors for distance measurement, a height profile is generated for determining the position of the obstacle. If the crane is, for example, a container crane which unloads containers as loads in a container terminal, then the stack heights of the containers result effectively in a container mountain as the height profile. With such a height profile, the calculation of the trajectory for automatic movement of the load by means of the crane is simplified.

BRIEF DESCRIPTION OF THE DRAWING

The invention will now be described and explained in greater detail making reference to the exemplary embodiments illustrated in the drawings.

DETAILED DESCRIPTION OF PREFERRED EMBODIMENTS

The exemplary embodiments set out in the following are preferred embodiments of the invention. In the exemplary embodiments, the described components of the embodiments each represent individual features of the invention that are to be regarded as independent of one another and each also further develop the invention independently of one another and are thus also to be considered individually, or in a combination different from that shown, as a constituent of the invention. Furthermore, the embodiments described are also enhanceable with others of the previously described features of the invention.

The same reference signs have the same meaning in the different figures.

Figure 1:
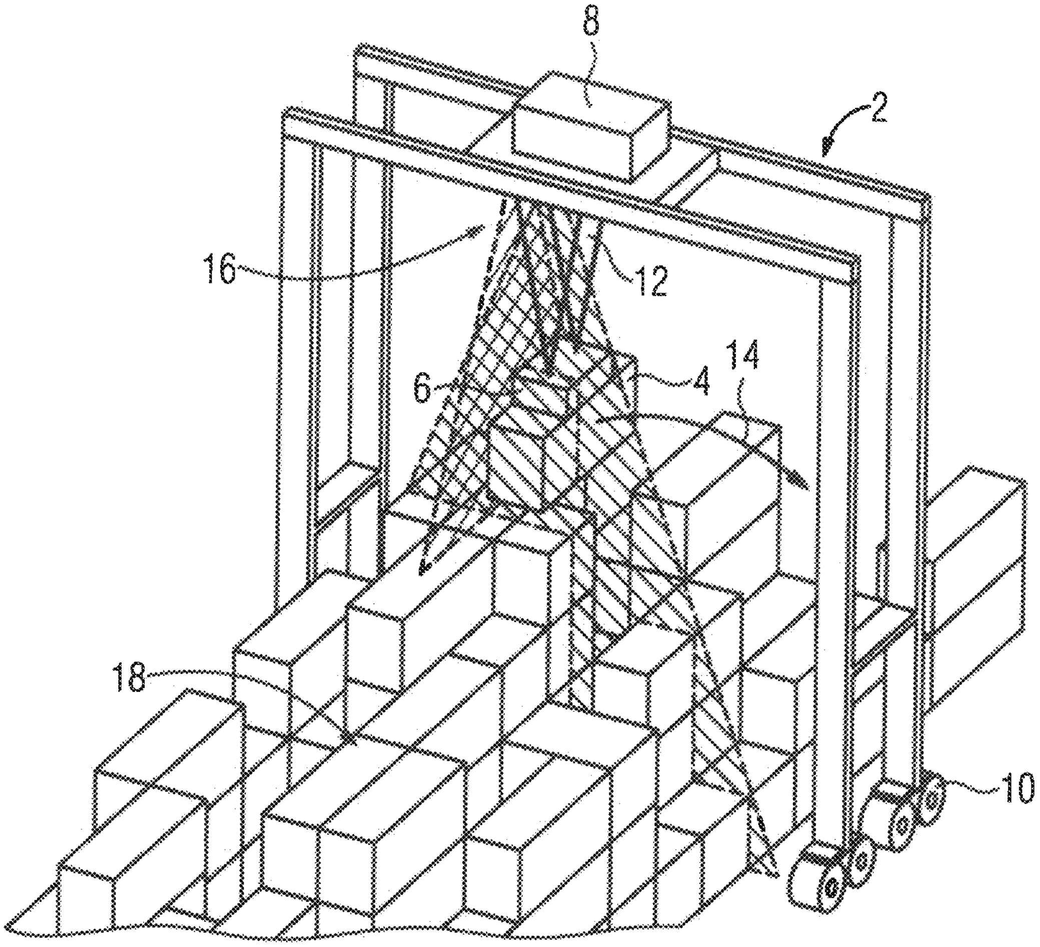
FIG. 1 is a perspective schematic representation of a crane.

FIG. 1 shows a perspective view of a crane 2 which is configured, for example as a gantry crane. A load 4, for example, a container, which is fastened to a container handling frame 6, also called a spreader, is moved by means of a travelling carriage 8, also called a trolley, by means of a running gear 10 and/or by means of a lifting gear 12 along an, in particular, three-dimensionally configured trajectory 14. The movement of the load 4 by means of the crane 2 takes place, in particular, automatically. By means of at least one sensor 16 for distance measurement a safe position of an obstacle 18, in FIG. 1 a "container mountain" is acquired in that a height profile is created. Alternatively, a known position of the obstacle 18 is provided. In particular, a safe position of the obstacle 18 is determined by at least SIL or PL-certified sensor systems. At least SIL and/or PL-certified sensors 16 of this type for distance measuring operate, for example, with radar and/or laser methods. In particular, the sensors 16 for distance measuring are configured with redundancy. The safe position acquisition of the obstacle 18 takes place, in particular, dynamically in that, for example, the height profile is periodically updated. The obstacle 18 prevents the load 4 being transportable by a direct, that is, a straight-line route to its destination. Therefore, on the basis of the height profile, a trajectory 14, for example, a parabolic movement in order to overcome the obstacle 18, is calculated. A swaying of the load 4 while it is moved along the trajectory 14 is minimized by oscillation damping, also called sway control, in order to prevent collisions or damage to the load and/or to increase a load transporting efficiency.

Figure 2:
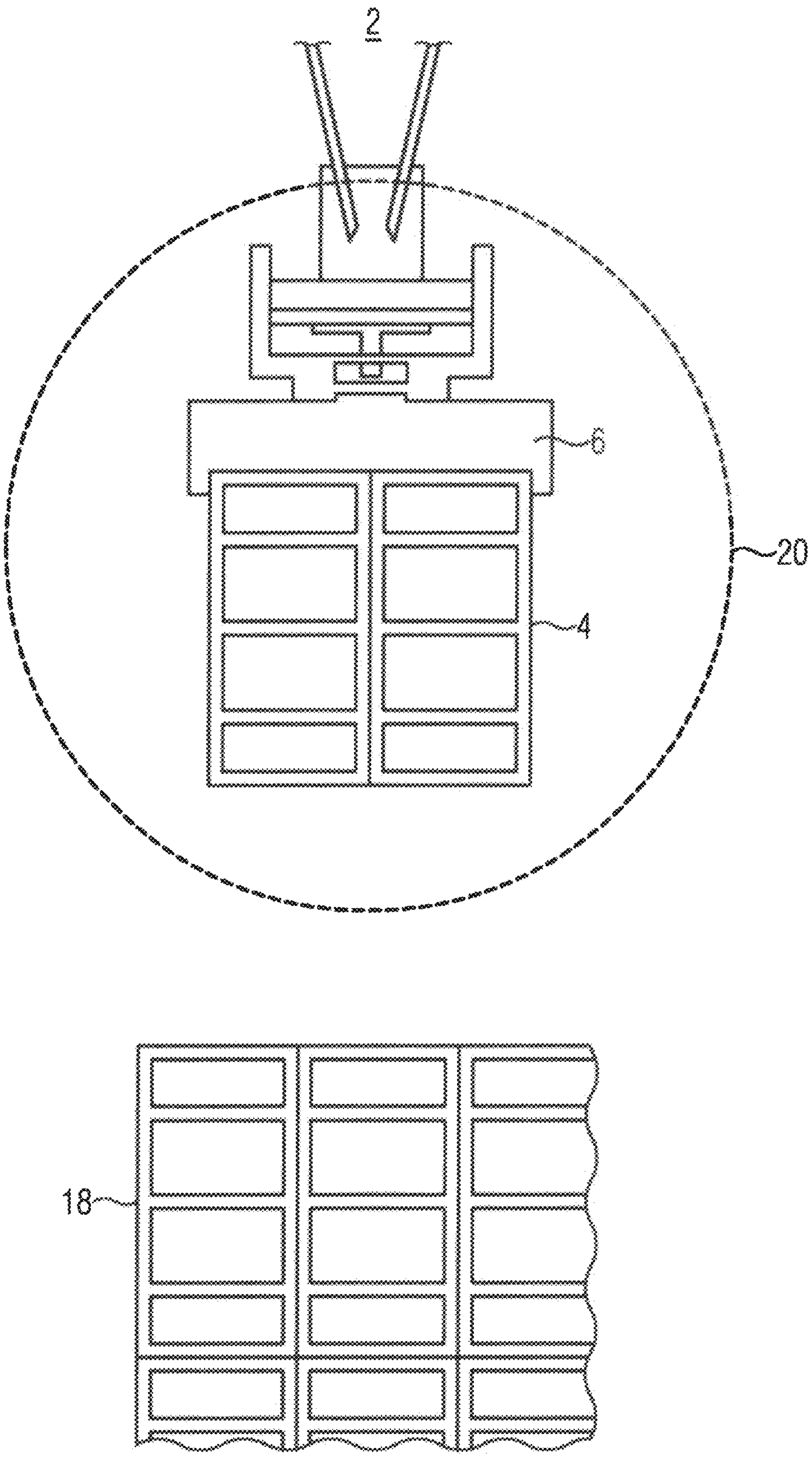
FIG. 2 is an enlarged schematic representation of a crane in the region of a load.

FIG. 2 shows an enlarged schematic representation of a crane 2 in the region of a load 4 which is moved over and beyond an obstacle 18. In order to ensure reliably a collision-free movement of the load 4, the crane 2 comprises an independent safe monitoring module for collision detection, to which a safe state variable of the load 4 is transmitted, wherein the safe state variable comprises a position, a velocity or an acceleration of the load 4. For example, a safe position of the load 4 is determined by means of a safe sensor system, certified in particular, at least in accordance with SIL and/or PL, on the trolley 8, on the running gear 10 and on the lifting gear 12, wherein a velocity and/or an acceleration of the load 4 are calculable directly from a change in the safe position.

The independent, safe monitoring module calculates in real time in a safe controller, from at least one safe state variable, a safety zone 20 surrounding the load 4, for example, from a position and a velocity. For example, the safety zone 20 is periodically calculated in temporal intervals dependent upon the safe state variable of the load 4. A safe controller comprises a safety program in a secure region. The safety zone 20 is configured, as shown in FIG. 2, for example, spherical or ellipsoid. In particular, a size of the safety zone 20 is adapted to a safe state variable of the load 4, for example, to a velocity or an acceleration. For example, the volume of the safety zone 20 is enlarged if the velocity or the acceleration of the load 4 is increased. Optionally, an oscillation model is included in the calculation of the safety zone 20 in order to take account also, for example, of a swinging-out of the load 4 on an abrupt deceleration.

The safe position acquisition of the obstacle 18 takes place as described in relation to FIG. 1. The independent, safe monitoring module dynamically monitors the safety zone 20 in relation to the position of the obstacle 18. For example, a stop signal is sent to a crane control system if the obstacle 18 is acquired in the safety zone 20 surrounding the load 4. The further configuration of the crane 2 in FIG. 2 corresponds to that of FIG. 1.

Figure 3:
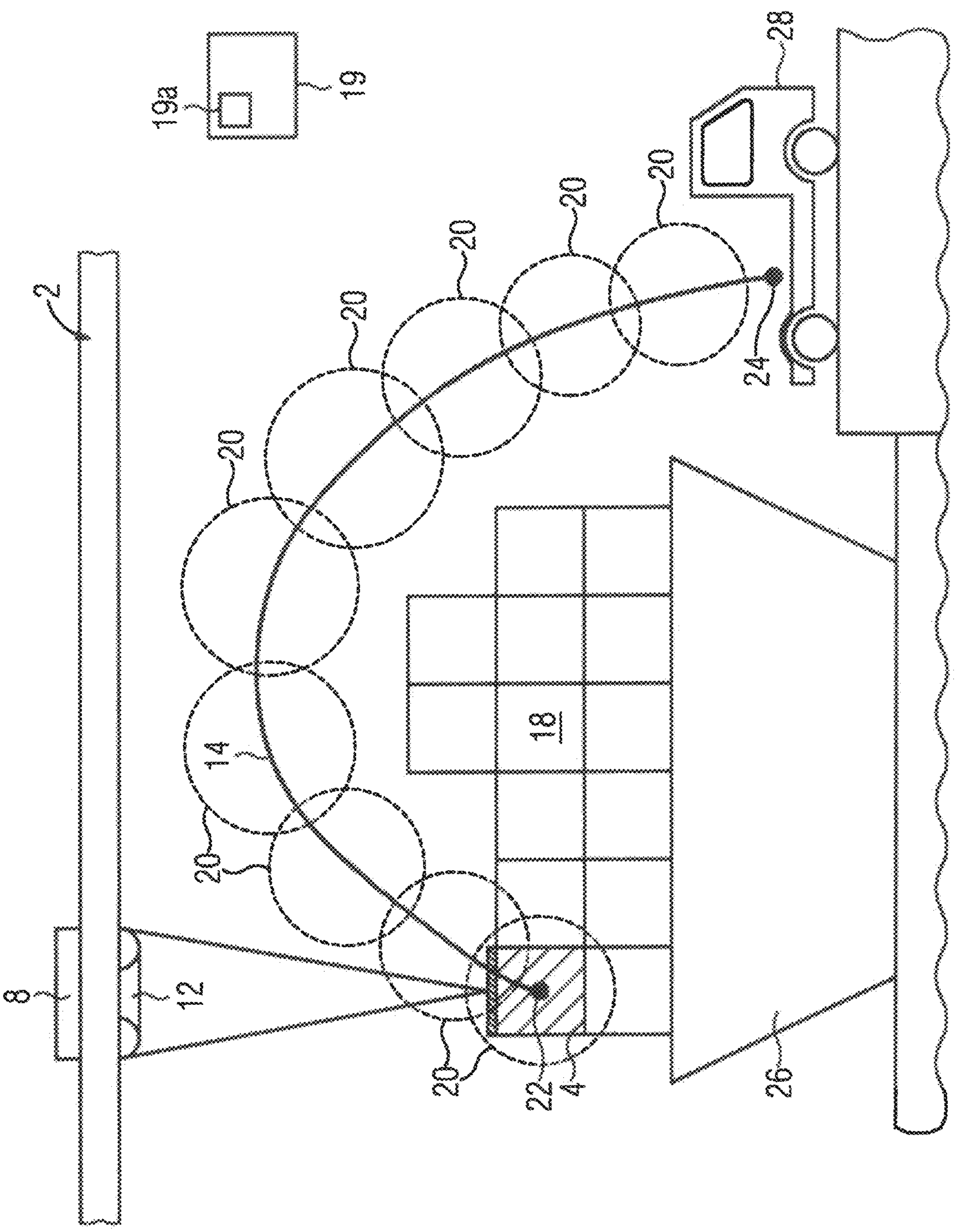
FIG. 3 is a schematic representation of a collision-free movement of a load from a start point to a target point.

FIG. 3 shows a schematic representation of a collision-free movement of a load 4 from a start point 22 to a target point 24, wherein the load movement takes place with the aid of a crane 2, in particular, automatically. By way of example, the load movement from a container ship 26 as the start point 22 to a heavy goods vehicle 28 as the target point 24 is shown, wherein the obstacle 18 which exists as a "container mountain" as described in relation to FIG. 1, is cleared in a parabolic movement along an, in particular, precalculated trajectory 14. In order to ensure a collision-free movement reliably, the crane 2 comprises an independent, safe monitoring module 19 for collision detection which, as described in relation to FIG. 2, calculates in a safe controller 19*a* in real time, the safety zone 20 surrounding the load 4. In particular, the size of the safety zone 20 that surrounds the load 4 is adapted, for example, to a velocity and/or an acceleration. The temporal change in the volume of the safety zone 20 represented, by way of example, as spherical, is shown schematically in FIG. 2 for a given obstacle 18, wherein the trajectory 14, as shown in FIG. 1 is calculated on the basis of the determined height profile of the obstacle 18. The further configuration of the crane 2 in FIG. 3, in particular of the independent safe monitoring module in FIG. 3 corresponds to that of FIG. 2.

Figure 4:
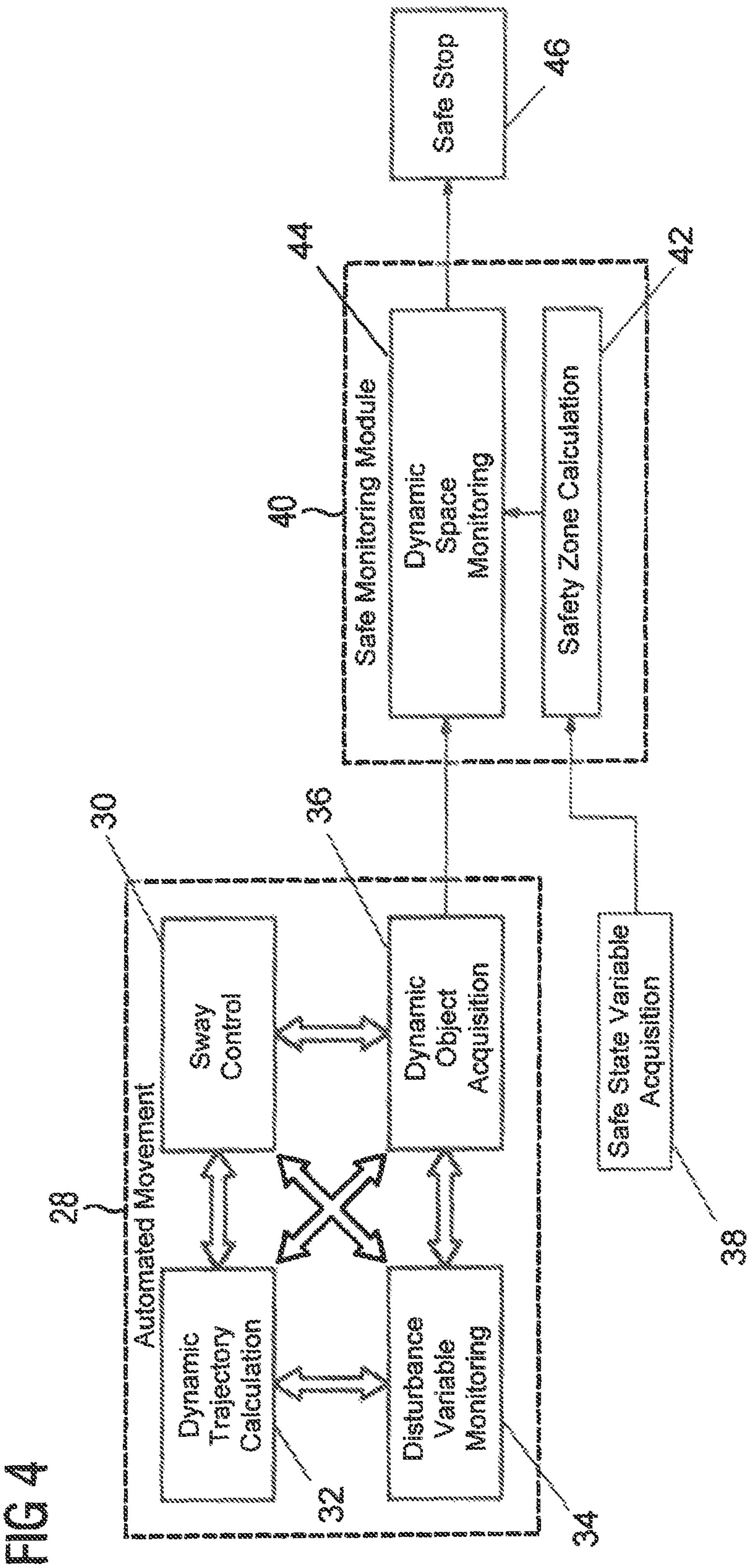
FIG. 4 is a flow diagram of a method for collision-free movement of a load.

FIG. 4 shows a flow diagram of a method for collision-free movement of a load 4. The automated movement 28 of the load 4 takes place with a high level of reliability by means of sway control 30, geometrical calculation 32 of the trajectory 14, disturbance variable monitoring 34 and, in particular dynamic, object acquisition 36. The object acquisition 36, that is, the acquisition of the position of the obstacle 18 takes place as described in relation to FIG. 1, safely, in particular, on the basis of a height profile by at least SIL or PL-certified sensor systems.

A safe state variable acquisition 38 of the load 4 takes place in parallel as described in relation to FIG. 2, for example, by means of a sensor system safety certified in accordance with SIL and/or PL, on the trolley 8, on the running gear 10 and on the lifting gear 12. An independent, safe monitoring module 40 carries out a safety zone calculation 42 on the basis of the safe state variable as determined. A dynamic space monitoring 44 takes place in that the safely acquired safety zone 20 is monitored in relation to the safely acquired position of the obstacle 18. A safe stop 46, for example, by sending a stop signal to a crane control system is initiated by the independent, safe monitoring module 40 when the obstacle 18 is detected in the safety zone 20 of the load 4.

Summarizing, the invention relates to a method for collision-free movement of a load 4 with a crane 2 in a space having at least one obstacle 18. In order to achieve a safety level in the simplest possible manner, it is proposed that a position of the obstacle 18 is acquired, wherein at least one safe state variable of the load 4 is determined, wherein from the safe state variable, a safety zone 20 surrounding the load 4 is determined, wherein the safety zone 20 is dynamically monitored in relation to the position of the obstacle 18.

What is claimed is:

1. A method for moving with a crane control system in automatic operation a load with a crane in a collision-free manner in a space having at least one obstacle, providing with a SIL (Safety Integrity Level) or PL (Performance Level) certified sensor a position of the at least one obstacle, determining with the SIL or PL certified sensor a height profile of the at least one obstacle, providing at least one safe state variable of the load, which includes a position of at least one movement axis, a velocity or an acceleration of the load, determining from the at least one safe state variable with a SIL or PL certified sensor system a safety zone surrounding the load, dynamically monitoring the safety zone in relation to the position of the obstacle, and sending with an independent, safe monitoring module, which implements a safety certification of the crane control system according to SIL or PL, a stop signal to the crane control system when the position of the obstacle is located in the safety zone surrounding the load.

2. The method of claim 1, further comprising acquiring a safe position of the obstacle using SIL or PL, certified sensors constructed for distance measurement.

3. The method of claim 1, wherein the at least one safe state variable of the load is determined from a safe state variable of at least one of a running gear, a lifting gear and a trolley of the crane.

4. The method of claim 1, further comprising determining from the height profile a safe trajectory for moving the load across the at least one obstacle, wherein along the safe trajectory is located outside the safety zone surrounding the load.

5. The method of claim 1, further comprising adapting a size of the safety zone to the safe state variable of the load.

6. The method of claim 1, wherein the safety zone is determined with a controller which comprises a safety program in a secure region.

7. The method of claim 6, further comprising sending with the safety program the stop signal to the crane control system.

8. The method of claim 1, wherein the safety zone is determined in real time.

9. The method of claim 1, wherein the safety zone is determined periodically in temporal intervals that depend on the safe state variable of the load.

10. The method of claim 1, wherein the safety zone is determined with an oscillation model.

11. The method of claim 1, further comprising executing the method independently of a movement of the load.

12. A controller comprising a safety program in a secure region, the controller configured to determine a safety zone surrounding a load that is moved with a crane in a collision-free manner in a space having at least one obstacle by providing with a SIL (Safety Integrity Level) or PL (Performance Level) certified sensor a position of the at least one obstacle, determining with the SIL or PL certified sensor height profile of the at obstacle, providing at least one safe state variable of the load, which includes a position of at least one movement axis, a velocity or an acceleration of the load, determining from the at least one safe state variable with a SIL or PL certified sensor system a safety zone surrounding the load, dynamically monitoring the safety zone in relation to the position of the obstacle, and sending with an independent, safe monitoring module a stop signal to the crane control system when the position of the obstacle is located in the safety zone surrounding the load.

13. A system having a crane for moving a load in a space having at least one obstacle, the system comprising an independent, safe monitoring module for collision detection between the load and the at least one obstacle and a controller comprising a safety program in a secure region, the controller configured to determine a safety zone surrounding a load that is moved with a crane in a collision-free manner in a space having at least one obstacle and implementing a safety certification of the system according to SIL (Safety Integrity Level) or PL (Performance Level), by providing with a SIL or PL certified sensor a position of the at least one obstacle, determining with the SIL or PL certified sensor a height profile of the at least one obstacle, providing at least one safe state variable of the load, which includes a position of at least one movement axis, a velocity or an acceleration of the load, determining from the at least one safe state variable with a SIL or PL certified sensor system a safety zone surrounding the load, dynamically monitoring with the independent, safe monitoring module the safety zone in relation to the position of the obstacle, and sending with the independent, safe monitoring module a stop signal to the crane control system when the position of the obstacle is located in the safety zone surrounding the load.

* * * * *